Feb. 5, 1935.　　　A. W. KNISLEY　　　1,989,697
LONG RANGE AERIAL GUN SIGHT
Filed Sept. 11, 1933　　2 Sheets—Sheet 1
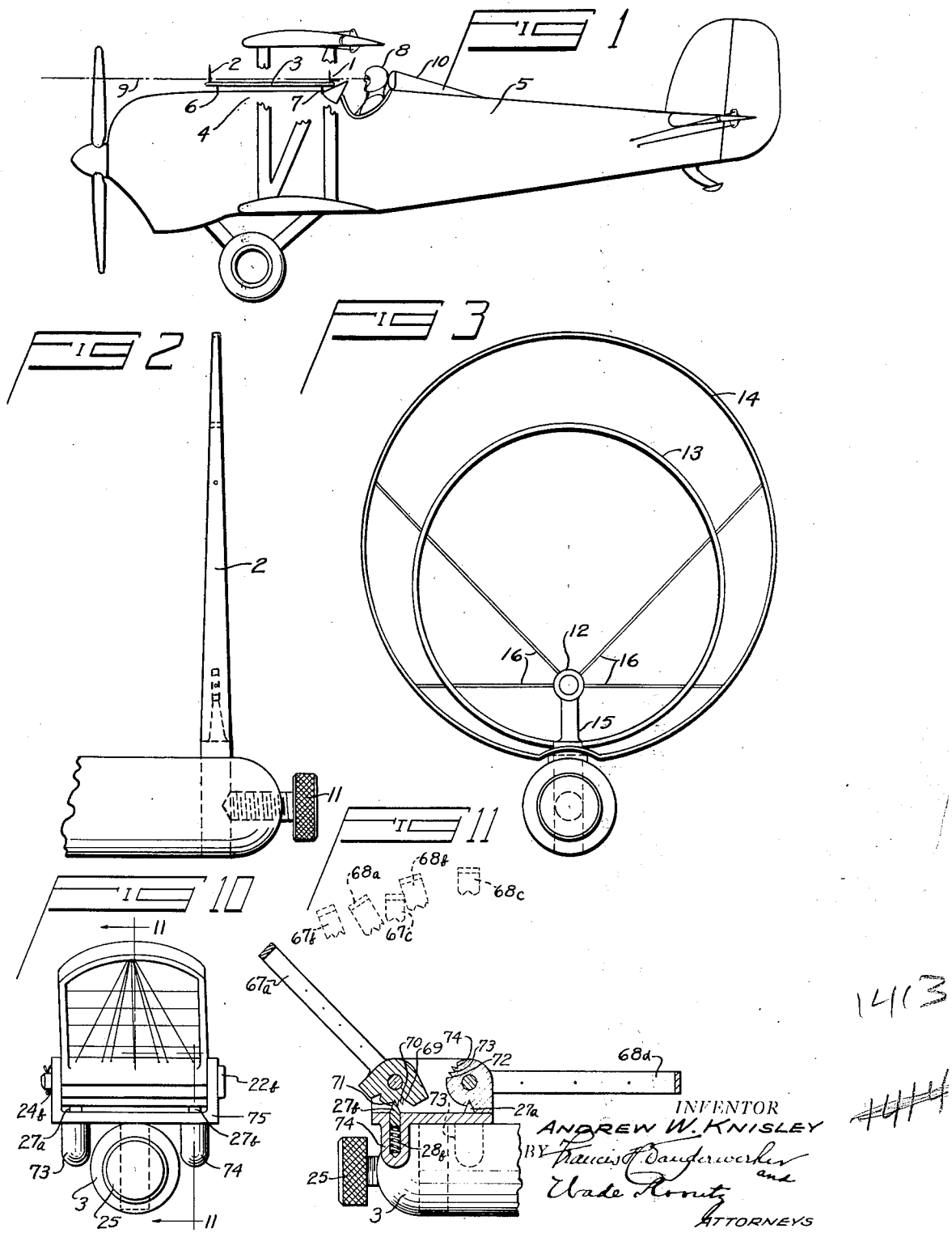
INVENTOR
ANDREW W. KNISLEY
BY
ATTORNEYS Feb. 5, 1935.　　　　A. W. KNISLEY　　　　1,989,697
LONG RANGE AERIAL GUN SIGHT
Filed Sept. 11, 1933　　2 Sheets-Sheet 2
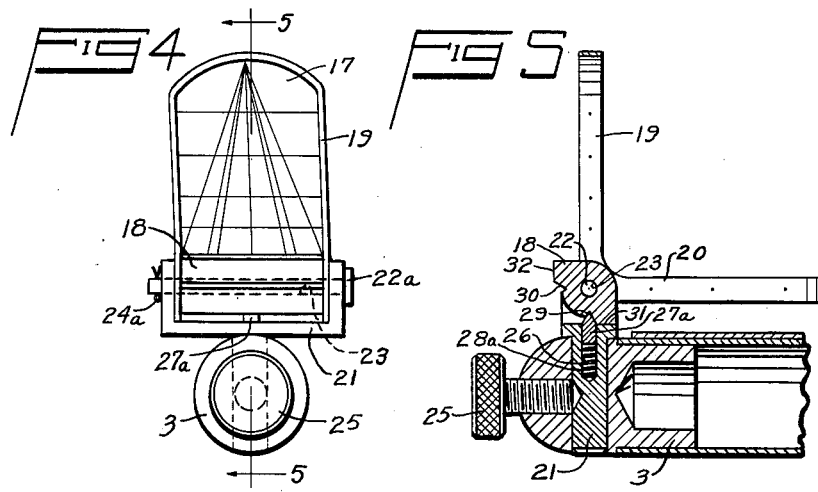
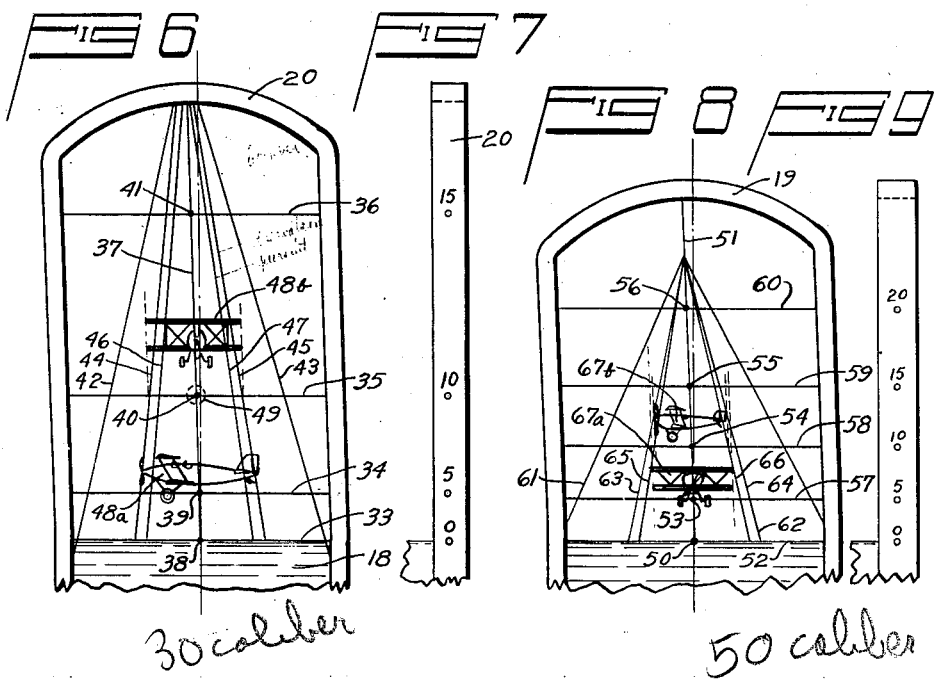
INVENTOR
ANDREW W. KNISLEY
ATTORNEYS Patented Feb. 5, 1935

1,989,697

UNITED STATES PATENT OFFICE 1,989,697

LONG RANGE AERIAL GUN SIGHT

Andrew W. Knisley, Dayton, Ohio

Application September 11, 1933, Serial No. 688,979

9 Claims. (Cl. 33—51)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to gun sights adapted for use against fast moving far distant aerial objects.

It is customary to equip military aircraft with bead and ring sights for use in connection with both fixed and flexible machine gun installations. Where used in connection with one of the former installations, the bead portion of the sight is arbitrarily located from 17 to 21 inches from the gunner's eye. The ring portion of the sight is located therebeyond, the distance forward depending upon the cowling or sub-structure available for its support and the diameter thereof upon the speed of the object to be fired upon. As the ring portion of the aforementioned "fixed gun sight" is provided with a small inner ring and as the gunner's head is presumed to be normally disposed in a position aligning the bead portion of the sight with said inner ring portion, this type of sight must necessarily be "sighted in" at an arbitrary distance, such as 100 yards. No consideration is thereafter given to "range" or variations in the distance away of an object fired upon. The aforementioned defect substantially eliminates the usage of the bead and ring sight for directing machine gun fire upon distant objects.

It is an object of my invention to supply a machine gunner flying within an arbitrarily fixed range of altitude with a rear machine gun sight which will enable him to instantly approximate the range of known types of aircraft.

It is another object of my invention to accomplish the aforementioned "range finding" for both the .30 cal. and .50 cal. machine guns through simple manual adjustment of a single sighting member.

It is a still further object of my invention to accomplish the "range finding" of the preceding paragraph for a series of arbitrarily fixed ranges of altitude through a series of single adjustments of one or the other of two separable sighting members.

Having ascertained the range of an object to be fired upon, and having mentally retained the position of its image with reference to certain datum lines provided upon his rear sight, the machine gunner utilizes the aforementioned image placement in combination with his conventional forward ring sight to correctly direct fire upon that object.

With the foregoing and other objects in view, which will appear as the description proceeds, the invention consists in certain new and novel improvements in long range aerial gun sights, which will be hereinafter more fully illustrated and described in the accompanying drawings and more particularly pointed out in the appended claims.

Referring to the drawings, in which numerals of like character designate similar parts throughout the several views:

Fig. 1 shows a side view of my invention installed upon a pursuit airplane.

Fig. 2 shows a close up side view of a conventional ring sight.

Fig. 3 shows a plan view of the above ring sight mounted upon its sighting bar.

Fig. 4 shows a plan view of one form of my invention mounted upon its sighting bar.

Fig. 5 shows a sectional view of Fig. 4 on the line 5—5.

Fig. 6 shows an enlarged plan view of the .30 cal. leaf portion of one form of my invention.

Fig. 7 is a side elevation of the above showing range graduation.

Fig. 8 shows an enlarged plan view of the .50 cal. leaf portion of one form of my invention.

Fig. 9 is a side elevation of the above showing range graduation.

Fig. 10 shows a plan view of a second form of my invention.

Fig. 11 shows a side view of Fig. 10 on the line 11—11.

In Fig. 1, my long range gun sight 1 and a conventional ring sight 2 are shown fixedly attached to a sighting bar 3. The sighting bar 3 is adjustably secured to a forward cowling 4 of a pursuit airplane 5 by means of mounting posts 6 and 7. The sighting bar 3 is so adjusted for elevation with reference to the vision of a pilot 8, that a line of sight 9 is maintained with the pilot's head disposed against a head rest 10. The aforementioned sight alignment is obtained by actual test at a machine gun range and is fixed, prior take-off of the airplane.

In Figs. 2 and 3, the ring sight 2 is secured to the forward end of the sighting bar 3 by means of a set screw 11 and is composed of an inner ring 12, an intermediate ring 13, an outer ring 14, a mounting stem 15 and brace wires 16. The eccentric placement of the outer two rings, with reference to the inner ring 12, takes care of the condition of climbing and diving, while the diameters of the rings 13 and 14 have been arbitrarily designed for lateral movement of a target object at the rate of 100 and 150 miles per hour, respectively. Use of the aforementioned ring sight 2, in combination with a simple bead surmounting a stem located at the rear of the sighting bar 3, is old to those skilled in the art and requires no discussion herein.

Figs. 4 and 5 show one embodiment of my long range gun sight 1. A sighting member 17 is composed of a base portion 18, a rear leaf 19 and a front leaf 20. The sighting member 17 is pivotally secured to a support 21 by means of a clevis pin 22a passed through a bearing 23 provided in the base portion 18. The clevis pin 22a is secured by a cotter pin 24a. The support 21 is secured to the rear end of the sighting bar 3 by means of a set screw 25 and is provided with a hole 26 into which are inserted an engaging pin 27a and a compression ring 28a. The engaging pin 27a is adapted to alternately seat in the grooves 29 and 30 provided in the base portion 18. Stops 31 and 32 are also provided upon the base portion 18 as additional support for the leaves of the sighting member 17.

The essence of my invention lies in a disclosure of Fig. 6. It is old in the art to employ an inverted U frame, such as that represented by the front leaf 20, in combination with horizontal filaments, such as those represented by the top surface 33 of the base portion 18 and horizontal wires 34 through 36, and a vertical filament such as that represented by the vertical wire 37, for correctly elevating a machine gun for known range at ground level under conditions of zero windage. The intersection 38 of the vertical wire 37 with the top surface 33 of the base portion 18 is utilized for "point blank" fire. In a similar manner intersections 39 through 41 are utilized for ground level firing upon objects known to be located at such arbitrary distances as 500, 1000, and 1500 yards, graduations of which may be noted upon a side of the rear leaf 19, as shown in Fig. 7. In Fig. 6, the vertical wire 37 is sloped approximately 2 degrees to the left of the true vertical $x-x$, in order to compensate for right hand drift of rapidly rotating machine gun projectiles. So much of the old art has been given as is essential to an understanding of my invention.

Desiring to principally apply my invention to operations against hostile heavier-than-aircraft, I have selected an average over-all dimension for pursuit, for observation, and for bombardment airplanes. Guided by these three dimensions, I have compiled three sets of front and side silhouettes of the aforementioned airplanes as they would appear to a gunner's eye at 500, 1000 and 1500 yards; including transposition of their over-all dimensions upon the wires 34, 35 and 36. For example, transposition of the over-all dimension of a 500 yard bomber's silhouette upon the wire 34 coincides with that portion of the wire 34 which lies between the converging wires 42 and 43, that of an observation silhouette to that portion of the wire 34 which lies between the converging wires 44 and 45, and that of a pursuit silhouette to the portion of the wire 34 which lies between the converging wires 46 and 47. I have thus made it possible for a machine gunner to so maneuver his airplane or flexible machine gun that an actual side profile 48a of an observation airplane, such as that shown in Fig. 6, may be "capped" by the converging wires 44 and 45, thus placing its range at approximately ⅕ of the distance of the 500 yard wire 34 from the 1000 yard wire 35, i. e., 600 yards. In a similar manner the range of an actual front profile 48b of the same airplane may be determined as approximately 1000 yards by raising the sighting member 27 until the major over-all dimensions of the profile coincide with that portion of the wire 35 lying between the converging wires 44 and 45. Having thus correctly determined the range of the object to be fired upon and having arbitrarily selected a point of projectile impact, it remains only for the machine gunner to retain mental placement of that impact point upon the wire 37, such as the "imaginary bead" 49 in the case of the front profile 48c, and to thereafter proceed in a manner identical to that observed with a conventional bead and ring sight.

The rear leaf 19, shown in Figs. 4, 5, 8 and 9, is designed for use in connection with a .50 cal. machine gun fired at ground level under conditions of zero windage. The intersection of the vertical wire 51 with the top surface 52 of the base portion 18 is utilized for "point blank" fire. In a similar manner intersections 53 through 56 of the horizontal wires 57 through 60, with the vertical wire 51, are utilized for ground level firing upon objects known to be located at such arbitrary distances as 500, 1000, 1500 and 2000 yards, graduations of which may be noted upon a side of the front sight 20, as shown in Fig. 9. From the closeness of these graduations, it will be observed that the ground trajectory of a .50 cal. projectile is considerably flatter than that of the smaller projectile fired by the .30 cal. machine gun and that the effective range of the former exceeds that of the latter. For this reason it has been possible to reduce the over-all height of the rear leaf 19, however, in other major respects, the two leaves are alike. The division of the wire 57, brought about by intersection of the converging wires 61 through 66 therewith, approximate similar divisions of the wire 34 of the front leaf 20. Proceeding in the same manner as discussed in the above paragraph, the machine gunner readily determines the range of a front profile 67a of a pursuit airplane to be approximately 900 yards distant and the range of a side profile 67b of the same airplane to be approximately 1,000 yards distant.

The preceding discussion of range has been limited to ground level, a condition which is rarely encountered during actual operation of military aircraft. For this reason, it is a further object of my invention to compensate for that marked flattening in machine gun trajectory which is encountered as an airplane increases its distance away from the ground. Figs. 10 and 11 show a modification of my invention whereby the machine gunner is able to separately position rear and front leaves 67 and 68 at varying angles to the true vertical. When secured in position 67b, by means of the engaging pins 27b and a groove 69, the rear leaf 67 is adapted for use at altitudes varying from ground level to 10,000 ft. In a like manner, when secured in position 67b and 67a by means of the same pin and grooves 70 and 71, the rear leaf 67 is adapted for uses at altitudes varying respectively from 10,000 to 20,000 ft. and from 20,000 ft. to the ceiling of the airplane upon which my invention is mounted.

The front leaf 68 may be secured in position identical to those enumerated above through respective engagement of the engaging pin 27a with the grooves 72, 73 and 74. In other respects arrangement of corresponding parts in Figs. 4 through 11 is identical. The only additions required were the clevis pin 22b, cotter pin 24b, and lug projections 73 and 74 in the support 75 for the purpose of housing the extra engaging pin 27b and compression spring 28b.

I claim:

1. A gun sight comprising a support and a sighting means attached thereto, said sighting means having reference means and a carrying means therefor, said reference means including a vertical reference line and a set of lines diverging downwardly and outwardly from an apex common to all such that capping of the profile of an aircraft of predetermined over-all dimensions will effect automatic gun elevation.

2. A gun sight comprising a support and a sighting means attached thereto, said sighting means having reference means and a carrying means therefor, said reference means including a vertical reference filament and a plurality of sets of filaments, each set having two filaments diverging downwardy and outwardly from an apex common to all such that capping of the profile of an aircraft of predetermined but different over-all dimensions for each set of diverging filaments will effect automatic machine gun elevation.

3. A gun sight comprising a support and a sighting means attached thereto, said sighting means having reference means and carrying means therefor pivoted about a horizontal axis normal to the longitudinal axis of the gun, means carried by said support for normally securing said carrying means in an upright position, said reference means including a filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

4. In an apparatus for sighting machine guns of different caliber and range a support and a sighting member attached thereto, said sighting member including two right angularly disposed leaves fixedly attached to a base portion pivoted about a horizontal axis normal to the longitudinal axis of a gun, means carried by said support for alternately securing one of said leaves normal to and the other of said leaves parallel to the longitudinal axis of a gun, a group of reference filaments for regulating nominal range fire and a group of reference filaments for regulating long range fire, each fixedly secured to one of said leaves, said reference filaments as separately viewed normal to said leaves comprising a centrally disposed filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

5. In an apparatus for sighting machine guns of different caliber and range a support and a forward and a rearward sighting member attached thereto, each of said sighting members including a frame composed of a leaf portion and a fixedly attached base portion pivoted about a horizontal axis normal to the longitudinal axis of a gun, a plurality of means carried by said support for separately securing said leaves alternately normal to or parallel to the longitudinal axis of a gun, a group of reference filaments for regulating nominal range fire and a group of reference filaments for regulating long range fire, each fixedly secured to one of said leaves, said filaments as separately viewed normal to said leaves comprising a centrally disposed filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

6. In an apparatus for sighting machine guns of different caliber and range a support and a forward and a rearward sighting member attached thereto, each of said sighting members including a frame composed of a leaf portion and a fixedly attached base portion pivoted upon a horizontal axis normal to the longitudinal axis of a gun, a plurality of means carried by said support for securing said leaves in a series of angular settings with reference to the longitudinal axis of a gun adapted to compensate for trajectory changes at predetermined altitudes above ground level, a group of reference filaments for regulating nominal range fire and a group of reference filaments for regulating long range fire, each fixedly secured to one of said leaves, said filaments as viewed separately normal to said leaves comprising a centrally disposed filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

7. In an apparatus for sighting machine guns of different caliber and range a support and a forward and a rearward sight member attached thereto, each of said sighting members including a frame composed of a leaf portion and a fixedly attached base portion provided with a set of longitudinal grooves and centrally pivoted about a horizontal axis normal to the longitudinal axis of a gun, a plurality of means carried by said support for engaging said sets of longitudinal grooves and thereby securing said leaves in a series of angular settings with reference to the longitudinal axis of a gun adapted to compensate for trajectory changes at predetermined altitudes above ground level, a group of reference filaments for regulating nominal range fire and a group of reference filaments for regulating long range fire, each fixedly secured to one of said leaves, said filaments as separately viewed normal to said leaves comprising, a centrally disposed filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

8. In an apparatus for sighting machine guns of different caliber and range a support and a forward and a rearward sighting member attached thereto, each of said sighting members including a frame composed of a leaf portion and a fixedly attached base portion provided with a set of longitudinal grooves and centrally pivoted about a horizontal axis normal to the longitudinal axis of a gun, a plurality of slidingly engaging means carried by said support for separately engaging said set of longitudinal grooves and thereby securing said leaves in a series of angular settings with reference to the longitudinal axis of a gun adapted to compensate for trajectory changes at predetermined altitudes above ground level, a group of reference filaments for regulating nominal range fire and a group of reference filaments for regulating long range fire, each fixedly secured to one of said leaves, said filaments as separately viewed normal to said leaves comprising a centrally disposed filament tilted slightly sidewise of normal to said horizontal axis, a plurality of sets of filaments, each set having two filaments diverging downwardly and outwardly from an apex common to said filaments, and a horizontally disposed set of filaments intersecting said vertical and said diverging filaments.

9. In an apparatus for sighting machine guns of different caliber and range a support and a forward and a rearward sighting member attached thereto, each of said sighting members including a frame composed of a leaf portion and a fixedly attached base portion provided with a set of longitudinal grooves and centrally pivoted about a horizontal axis normal to the longitudinal axis of a gun, a set of engaging pins and compression springs carried by said support for separately engaging said sets of longitudinal grooves and thereby securing said leaves in a series of angular settings with reference to the longitudinal axis of a gun adapted to compensate for trajectory changes at predetermined altitudes above ground level, a group of reference filaments for regulating nominal range fire and a group of reference filaments for regulating long range fire, each fixedly secured to one of said leaves, said filaments as separately viewed normal to said leaves comprising a centrally disposed filament tilted slightly sidewise of normal to said horizontal axis, a plurality of sets of filaments, each set having two filaments diverging downwardly and outwardly from an apex common to said filaments and a horizontally disposed set of filaments intersecting said vertical and said diverging filaments.

ANDREW W. KNISLEY.